United States Patent [19]

Dickey, Jr. et al.

[11] Patent Number: 4,608,569
[45] Date of Patent: Aug. 26, 1986

[54] ADAPTIVE SIGNAL PROCESSOR FOR INTERFERENCE CANCELLATION

[75] Inventors: Frank R. Dickey, Jr., Dewitt; William A. Penn, Baldwinsville, both of N.Y.

[73] Assignee: General Electric Company, Syracuse, N.Y.

[21] Appl. No.: 530,626

[22] Filed: Sep. 9, 1983

[51] Int. Cl.$^4$ ................................. G01S 3/86
[52] U.S. Cl. ...................................... 343/384
[58] Field of Search ............... 343/9 PS, 378, 379, 343/384; 367/905; 11/901; 324/77 K

[56] References Cited

U.S. PATENT DOCUMENTS

| | | | |
|---|---|---|---|
| 2,451,465 | 10/1948 | Barney | 250/41.5 |
| 2,595,691 | 5/1952 | Morton | 343/13 |
| 3,088,113 | 4/1963 | Rosenthal | 343/17.1 |
| 3,111,666 | 11/1963 | Wilmotte | 343/16 |
| 3,214,700 | 10/1965 | Hook | 328/165 |
| 4,326,778 | 4/1982 | Berg et al. | 350/358 |

OTHER PUBLICATIONS

Monzingo et al., *Introduction to Adaptive Arrays*, Hughes Aircraft Co., 1980, John Wiley & Sons, Inc., Wiley-Interscience publication, pp. 451–453.
Rhodes, *An Adaptive Filter*, Dept. of Defense, Ft. Meade, MD Feasibility Study, TR-R55-0014-81, S-223,099, 10 Oct. 1981.
Mercer, *A Time Integrating Correlator for Adaptive Array Processing*, Air Force Institute of Technology, WPAFB, OH, AFIT/GEO/EE/82D-5, 22 Feb. 1983.
Rhodes et al., *Adaptive Filtering with Correlation Cancellation Loops*, National Security Agency, Ft. Meade, MD, SPIE, vol. 341–Real Time Processing V(1982), Arlington, VA 5/4–7/1982, pp. 140–146.
Penn, Acousto-Optic Adaptive Signal Canceller, *Proceedings of the Lasers and Electro–Optics Symposium*, ICALEO '82, LIA-Laser Instit. of America, vol. 34, 9/20–23/82, Boston, MA, pp. 9–17.
Casasent et al., Frequency-Multiplexed and Pipeline Iterative Optical Systolic Array Processors, *Applied Optics*, vol. 22, No. 1, 1 Jan. 1983, pp. 115–124.
Rhodes, Adaptive Filter With a Time-Domain Implementation Using Correlation Loops, *Applied Optics*, vol. 22, No. 2, 15 Jan. 1983, pp. 282–287.
Casasent et al., Optical Processors for Adaptive Phased-Array Radar, Proc. Soc. Photo-Opt Instrum. Eng..(USA).
SPIE, vol. 209, Optical Signal Processing for C$^3$(1979), pp. 47–52.

*Primary Examiner*—Theodore M. Blum
*Assistant Examiner*—Mark Hellner
*Attorney, Agent, or Firm*—Richard V. Lang; Carl W. Baker

[57] ABSTRACT

The present invention relates to an adaptive signal processor for reducing interference in ranging and communication systems resulting from jamming or multipath reception. More particularly, an optical signal processor is provided in which a first time correlation is performed between the receive signal derived from a direction antenna and an interference signal derived from one or more auxiliary omnidirectional antennas in an acousto-optical device to obtain one or more corresponding weighting functions stored as a function of signal delay. The auxiliary signal is then correlated in a spatial correlation process in which the auxiliary signals are delayed and multiplied with the weights and the result spatially integrated to derive the predicted interference. The predicted interference is then subtracted from the main signal in an adaptive feedback loop wherein the predicted signal is made to approach equality with the interference. The system achieves good cancellation by correcting for multiple arrival times and by retaining the phase and amplitude information of the original carriers throughout the optical process.

15 Claims, 6 Drawing Figures

ADAPTIVE SIGNAL PROCESSOR FOR INTERFERENCE CANCELLATION

The Government has rights in this invention pursuant to Contract F30602-81-C-0264 awarded by the Department of the Air Force.

BACKGROUND OF THE INVENTION

1. Field of the Invention:

The present invention relates to radio and sonic systems for ranging and for communication. More particularly, the invention relates to signal processors for reducing interference in such systems from multipath reception or from jamming or from jamming received via multiple paths.

2. Description of the Prior Art:

In radar systems, jamming is a well known countermeasure to prevent effective ranging on a potential target. One or more wideband transmitters for target defense may be provided which are arranged so as to radiate radio frequency energy toward the main radar antenna in the transmission band. In a conventional radar system, the main antenna has a highly directional beam with minor lobes to either side of the main lobe. The interference received via the sidelobes may achieve levels comparable to the main target return and thus interfere with ranging. Devices which attack this problem have been termed "sidelobe cancellers".

Known "sidelobe cancellers" have taken the form of adaptive signal processors in which interference is derived in omnidirectional antennae separate from the main directional antenna. The interference is then reconstructed by correlation techniques in such a way that when subtracted from the main antenna return, the interference is cancelled. In a practical situation, the process is complicated by the possibility of a plurality of jammers and a plurality of transmission paths for each jammer. The known solution has been to create a plurality of correlation feedback loops in which a very complex interference pattern may be reconstructed and then cancelled from the main return. Proposals to achieve this are known and are dealt with in the book entitled "Introduction to Adaptive Arrays" by Monsingo and Miller (John Wily, Chapter 11). The practical complexity of the problem, particularly where a multiplicity of both auxiliary antennae and of time delay values are required, has tended to frustrate standard all-electronic solutions.

The advent of optical processing has provided the possibility of providing a less cumbersome, more versatile and more adaptive solution to the interference problem. In principle, one may consolidate a large number (e.g. 1000) of correlation loops with a 60 MHz bandwidth in a small assemblage of acousto-optical and solid state devices in which the essential correlation processes are carried out in individual pixels of optical patterns, which are transformed and transferred through the assemblage.

While optical processing has been proposed in the literature, neither the practical nor theoretically rigorous requirements for an adaptive optical processing carrier system have been disclosed.

While a major emphasis of investigation in the literature has been directed toward the defense against jamming in radar systems, the principles of interference cancellation are equally applicable to sonar systems as well as to communication systems in which multipath problems interfere with proper signal acquisition.

SUMMARY OF THE INVENTION

Accordingly, it is an object of the invention to provide an improved signal processor for interference cancellation.

It is a further object of the invention to provide an improved signal processor using optical techniques for interference cancellation.

It is another object of the invention to provide an improved optical processor for interference cancellation in an echo ranging system.

It is still another object of the invention to provide for cancellation of interference traversing multiple paths.

It is an additional object of the invention to provide an improved optical signal processor for a cancellation of interference from multiple sources in an echo ranging system.

It is another object of the invention to provide an improved optical signal processor for cancellation of interference from multiple sources traversing multiple paths in an echo ranging system.

It is still another object of the invention to provide an improved optical signal processor of reduced physical size and maximum versatility.

These and other objects of the invention are achieved in an echo ranging or communication system in which a signal is received by a directional main antenna with possible interference including multipath signals. The main antenna signal is converted to a modulation on a carrier of intermediate frequency denoted m(t); and at least one auxiliary, substantially less directional antenna (i) is provided for intercepting interference. The auxiliary antenna signal is also converted to a modulation on the same carrier denoted $a_i(t)$. The novel processor generates a predicted interference signal $\hat{m}(t)$, modulated on the same carrier at an appropriate phase and amplitude for interference cancellation, and effects the cancellation.

The novel processor comprises an optical time integrating correlator for deriving a correlation function (or weight) W(x) by multiplying the residual signal r(t) (an approximation of the main signal with the interference therein cancelled) in optical form with each auxiliary signal $a_i(t)$ in acoustic form in an acousto-optical modulator to obtain a first spatial pattern, and integrating each element of the first optical pattern over time to obtain a second spatial pattern defining the correlation function (or weight) W(x) perpetuating the electrical carrier in spatial format; a space integrating optical correlator for multiplying the second spatial pattern of the correlation function (or weight) W(x) in optical form with each auxiliary signal ($a_i(t)$) in acoustic form to obtain a third spatial pattern perpetuating the electrical carrier in spatial format, which is then integrated over "space" in a single optical detector to derive the approximate predicted interference signal $\hat{m}(t)$ in electrical format (which retains phase and amplitude signal information as modulations upon the carrier); and, finally, cancellation means in an adaptive feedback path for performing the electrical cancellation and obtaining a residual electrical signal r(t) (as a modulation on the carrier).

In accordance with a further aspect of the invention, the optical time integrating correlator comprises a source of quasi-coherent optical radiation in the visible or near visible spectrum, a modulator for modulating the optical radiation with the residual signal (r(t)) and an acoustic wave delay line light modulator such as a Bragg type modulator to which the modulator light output (r(t)) is applied and in which each auxiliary signal ($a_i(t)$) is applied to excite acoustic waves, the modulator providing element by element multiplications between the optical and acoustic waves to obtain a first spatially distributed pattern of products. (Assuming a plurality of auxiliary signals is provided, a like plurality of Bragg modulator sections are also provided, adjacent to one another for simultaneous optical interactions between the modulated optical radiation and acoustic waves excited by the additional auxiliary signals.) The correlation function (or weight) W(x) is obtained in the form of a second spatial pattern by a time integration of each element of the first spatial pattern in a time integrating optical means.

In accordance with a further aspect of the invention, the space integrating optical correlator comprises a second acousto-optical Bragg delay line modulator to which the second spatial (optical) pattern is applied for interaction with the acoustic waves excited by the auxiliary signal ($a_i(t)$) to form a third optical pattern. An optical detector, in which light from the full third pattern is summed, completes the space integrating function.

The optical processor is completed by the provision of the electronic cancellation means in an adaptive feedback path in which the output of the optical detector is passed through a filter to obtain the predicted interference $\hat{m}(t)$ on the carrier, which is then subtracted from the main signals m(t) (also on the carrier), and subtraction means to obtain the complex difference between these signals (r(t)) (also on the carrier), which completes the adaptive feedback loop.

In the interest of simplification of the optical processor, the Bragg modulator, which is used to perform the first multiplication to form the first pattern in the time correlation, is reused to perform the second multiplication to form the third pattern in the space correlation.

In accordance with another facet of the invention a single surface acoustic wave optical interaction device is proposed to perform the space integrating correlation function.

BRIEF DESCRIPTION OF THE DRAWINGS

The novel and descriptive features of the invention are set forth in the claims appended to the present application. The invention itself, however, together with further objects and advantages thereof may best be understood by reference to the following description and accompanying drawings, described below:

FIG. 1 also illustrates the radar receiver of which the processor is a part;

DESCRIPTION OF THE PREFERRED EMBODIMENTS

Figure 1:
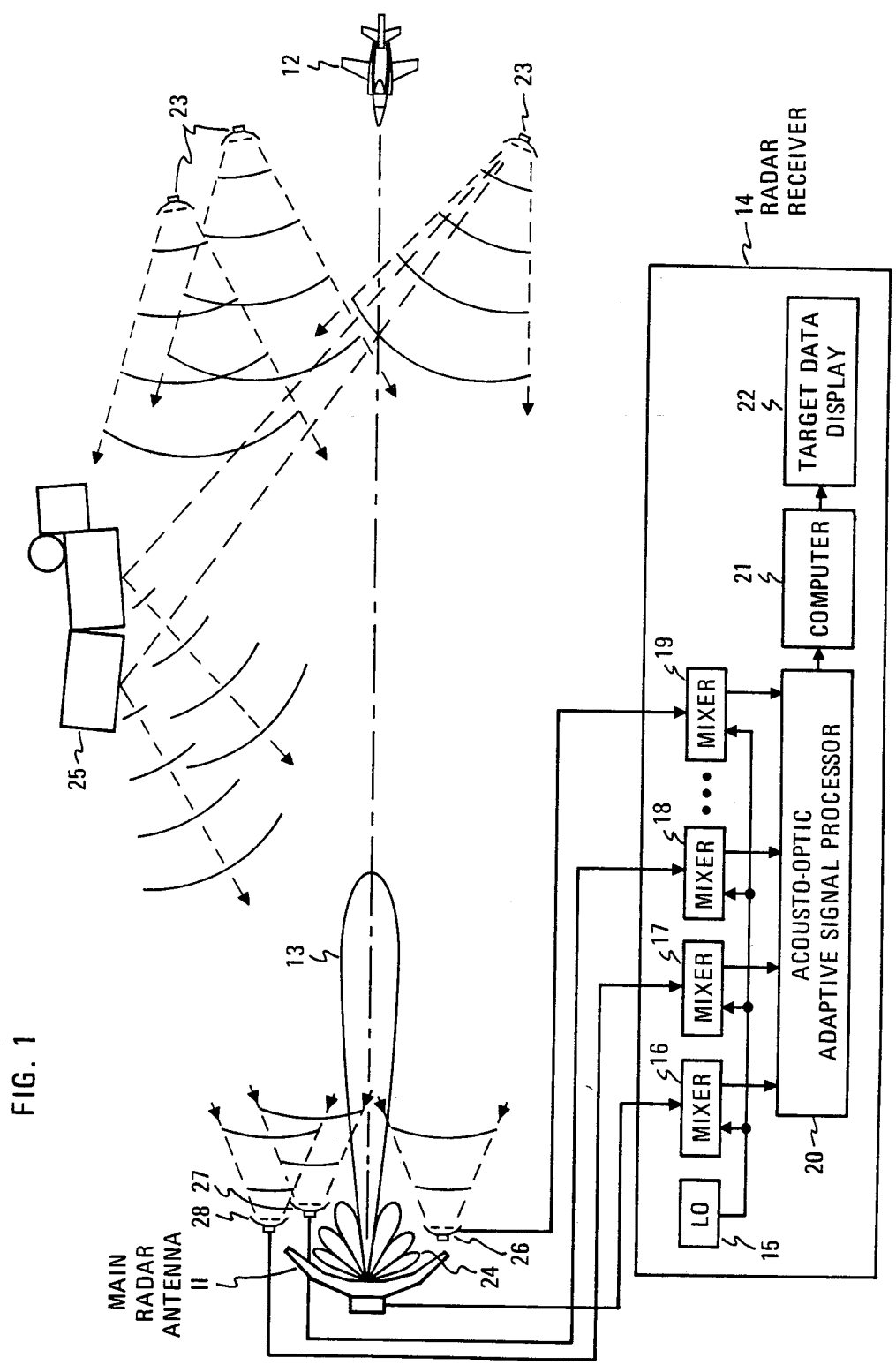
FIG. 1 is an illustration of a radar system in which the inventive acousto-optical adaptive signal processor is applied to perform interference cancellation.

Referring now to FIG. 1, a radar system is shown in which the novel acousto-optical adaptive signal processor is applied to perform interference cancellation. While the invention is shown in application to a radar system, it also has application to a sonar system or to a communications system, in which the interference is caused by multipath reception of the signal. In a radar system, a directional main antenna 11, having a directivity pattern 13 is used and having been directed by electrical or mechanical means to a target 12, is empowered by a transmitter (not illustrated) to radiate microwave energy toward the target. Customarily, the microwave energy is radiated in a short pulse format. A transmit-receive (TR) device (not illustrated), which disconnects the radar receiver 14 from the main antenna during transmission, reconnects the radar receiver to the main antenna to detect microwave energy impinging on the antenna after the short pulse transmission. With a target present, the transmitted microwave energy impinges on and is reflected from the target 12 back into the directional main antenna. The radar receiver (14–22) detects the radar return and an included computer 21 determines the angular position and range of the target.

The scenario just depicted assumes no means acting in defense of the target (12) to prevent the radar from determining target position and range. In what is assumed to be a practical tactical situation, radar jammers 23 may be present, whose mission is to interfere with the acquisition of such target data. In the assumed tactical case, one or more such transmitters 23 may be present.

These "jammers" will radiate electromagnetic energy toward the main antenna within a frequency band that will overlap the frequency of the radar transmitter. The jammer signal may either be continuous or modulated in such a way as to resemble the original radar transmission. The jammers 23 are assumed to be either stationary or slowly moving in relation to the radar transmitter. It is further assumed that if jamming energy happens to exist in the main lobe of the radar receiver, it does not persist for a long period of time, although this restriction could be relaxed by employing additional circuitry of a type which is well known and usually described as "main lobe maintenance".

The directionality of the antenna determines its ability to locate targets as well as its sensitivity to jamming. The directionality of the main antenna may be plotted on polar graph paper as a series of closed loops or lobes having a radius R indicative of "antenna gain" confined between angular coordinates about the antenna origin. The main lobe is depicted as having a radius or gain which is many times greater than the gain of the minor lobes and it will lie within a small central angle of a few degrees or small fractions thereof. The minor lobes will make up an irregular pattern of alternate nulls and sensitivities extending to 180° in azimuth on either side of the main (e.g. 30 db below) lobe. The minor lobes 24 are of low gain in relation to the main lobe but, except for nulls between lobes, fill in the angular region outside the main lobe. The usual objective of directional antenna design is to maintain the gain of these so called side lobes at a low level in relation to the main lobe so as to prevent any ambiguity in the target direction or the creation of phantom targets. In a tactical situation, it is assumed that the main lobe of the radar antenna is directed toward the target.

Assuming that the main lobe 13 of the antenna is directed toward the target and not toward a jammer, the jammers may yet produce interference if the jamming energy, in impinging on the main antenna, avoids one of the nulls existing between the side lobes and impinges on one of the side lobes. Since side lobes are always present and the nulls between them very small, the probability is high that a jamming signal launched toward the antenna will be intercepted by the main antenna. Since the jamming signal need only travel via a single path to the radar antenna, a relatively low power jamming signal, at a distance comparable to the target distance from the radar antenna, and subject only to attenuation by an inverse square law of that distance as opposed to an inverse fourth power law of that distance for the reflected wave, may arrive at sufficiently high intensity to offset the differential gain between the main lobes and side lobes of the main antenna. When the interference signal is received by the radar receiver associated with the main antenna it may either image the jamming information in such a way as to create the appearance of additional targets or it may even introduce energy at a sufficiently high level and continuity to obscure all target returns.

The jamming problem has been discussed thus far without reference to multiple paths. The multi-path problem adds a second element of complexity to the jamming problem. Assuming that the jammers are omni-directional, then radiation traveling from a given jammer toward the main antenna may arrive at the main antenna from one of several different directions if suitable reflective surfaces are present between the jammer and the antenna. Suitable reflective surfaces may occur in an open country landscape by the presence of trees and hills and in a more urban landscape by the presence of buildings such as the structure depicted at 25. In the case of each of the jammers 23 illustrated in FIG. 1, there may be a surface present on the structure 25 which will reflect energy from the jammer into one of the side lobes 24 of the main antenna. The presence of both the direct transmission from a selected jammer and a second, reflected, transmission from the same jammer has the effect of creating from one jammer, two virtual sources of jamming interference.

The present invention is designed to cancel interference caused by an arbitrary number of jammers, in a context in which each jamming signal traverses multiple paths before impingement on the main antenna. The cancellation of such interference has required an adaptive implementation because of the variability in antenna direction and jammer position. The approach involves the provision of a separate electronic cancellation loop for each assumed degree of freedom of the jamming interference. Thus, one degree of freedom is assumed for each jammer and for each possible distinct path by which the jamming energy arrives at the main antenna from each assumed jammer.

In the simplest case, interference produced by a single jammer whose transmissions traverse a single path to the main antenna may be cancelled by providing a single auxiliary antenna 26 in proximity to the main antenna 11 in which samples of the interference created by the jammer may be sensed. Cancellation of the interference produced in the output of the main antenna (11) may be achieved in a single feedback loop by cross-correlating that output (containing both target information and interference) with the interference sample received by the omni-directional auxiliary antenna (26). The correlation value thus determined is a complex variable called a "weight" ($W_{nj}$). The "weight" is then multiplied by the interference waveform derived by the auxiliary antenna to adjust the interference waveform in amplitude and phase. A properly correlated adjustment causes the interference derived from the auxiliary antenna to precisely equal that in the main antenna, permitting a subtraction to eliminate the interference from the output of the main antenna. This cancellation process has been termed "side lobe cancellation", since it may be regarded as producing a null in the side lobe of the antenna oriented toward the jammer. This terminology also reflects the observation that the electrical energy introduced for cancellation may not only create the desired null in a pre-existing side lobe but may effect a virtual redistribution of adjoining side lobes in the electrical output of the antenna.

In the usual tactical situation, the transmission from each jammer may arrive simultaneously over several paths of differing time delay. The resulting distorted waveform can only be adequately cancelled if a large number of degrees of freedom in the time domain are provided. This implies use of a large number of delay line taps or of a continuum of delay values as is provided in our implementation. Thus, to deal with a large number of jammers in the multi-path situation, one must provide at least a like number of auxiliary antennae, each having an associated delay line with a large number of taps or a continuum of delay values spanning the expected transmission delays.

In accordance with the present invention, the problem of achieving the required, high degree of freedom in each multi-path delay is achieved by means of an acousto-optical delay line which is associated with the signal derived from each auxiliary antenna. In the optical realization, each resolvable optical element along the acousto-optical delay line represents an available increment in the delay and produces an additional degree of freedom in respect to the delay time for solution of the multipath problem. This provides both a continuum in the amounts of delay associated with each tap as well as many or as few taps as may be required to effect cancellation.

The adaptive feedback loops, which use correlation, adapt the processor to a complex pattern of interference and achieve the desired interference cancellation.

The elements in the adaptive interference cancelling system are shown in a block diagram format in FIG. 1. Three auxiliary antennas 26, 27, 28 are provided to permit cancelling the assumed three jammers 23. The radar receiver, shown at 14, which comprises the elements 15 through 22 has an input for the main antenna and for each auxiliary antenna.

The particular connections to the radar receiver are as follows. The main antenna 11 supplies a return containing both the desired signal and interference to the main mixer 16 of the radar receiver. A local oscillator 15 of stable amplitude and frequency is also coupled to the mixer. The mixer 16 converts the input quantity (m(t)) to a modulation upon a carrier at an intermediate frequency (IF) equal to the difference between the transmitter and the local oscillator frequencies. The mixing process preserves both the phase and amplitude information of the recieved signal. The quantity m(t) at IF frequency is then coupled to one input port of the adaptive signal processor within the radar receiver. Each auxiliary antenna (26, 27, 28) supplies a signal containing the interference attributable to at least one of the jammers and couples it to one of the auxiliary mixers 17, 18, or 19 of the radar receiver. The local oscillator 15 is also coupled to the mixers 17, 18 and 19. The mixers 17, 18 and 19 convert the input quantities to modulations $a_1(t)$, $a_2(t)$, $a_3(t)$ upon the IF carrier preserving both the phase and amplitude information of the signals received by those auxiliary antennae. The quantities $a_i(t)$ on the IF carrier are then coupled to separate input ports of the acousto-optical adaptive signal processor 20. The acousto-optical adaptive signal processor 20 as earlier described, calculates the weights for each auxiliary return and for each time delay value by a correlation process, multiplies each time delayed auxiliary return by the associated weights, and combines the weighted returns to obtain a predicted interference and then makes the necessary subtraction between the predicted interference and the main return containing both signal and interference. The predicted interference must be of suitable phase and amplitude in relation to said IF carrier to eliminate the interference in the "residual" processed output (r(t)). The processor 20 is then coupled to computer 21 in which target data is computed and then applied to a suitable target data display 22.

Figure 3:
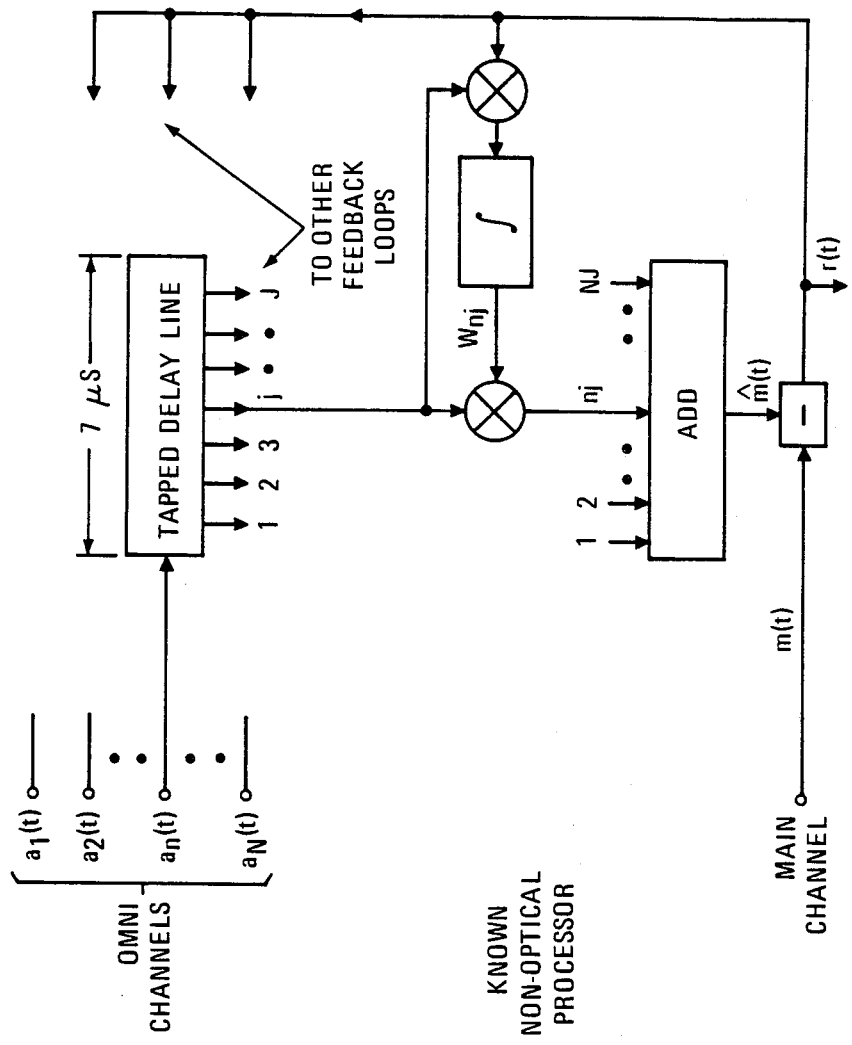
FIG. 3 is an illustration of a block diagram form of a known art multi-loop electronic cancellor employing tapped delay lines and plural correlation cancellation loops for interference cancellation. The drawing is provided as an aid to understanding the operation of the present optical system, in which a continuum of taps are available.

The prior art method of performing the functions of processor 20, i.e. using electrical rather than optical components, is shown in FIG. 3. This figure also serves as an equivalent circuit representation of the acousto-optical processor which may be helpful in understanding its operation.

Figure 2:
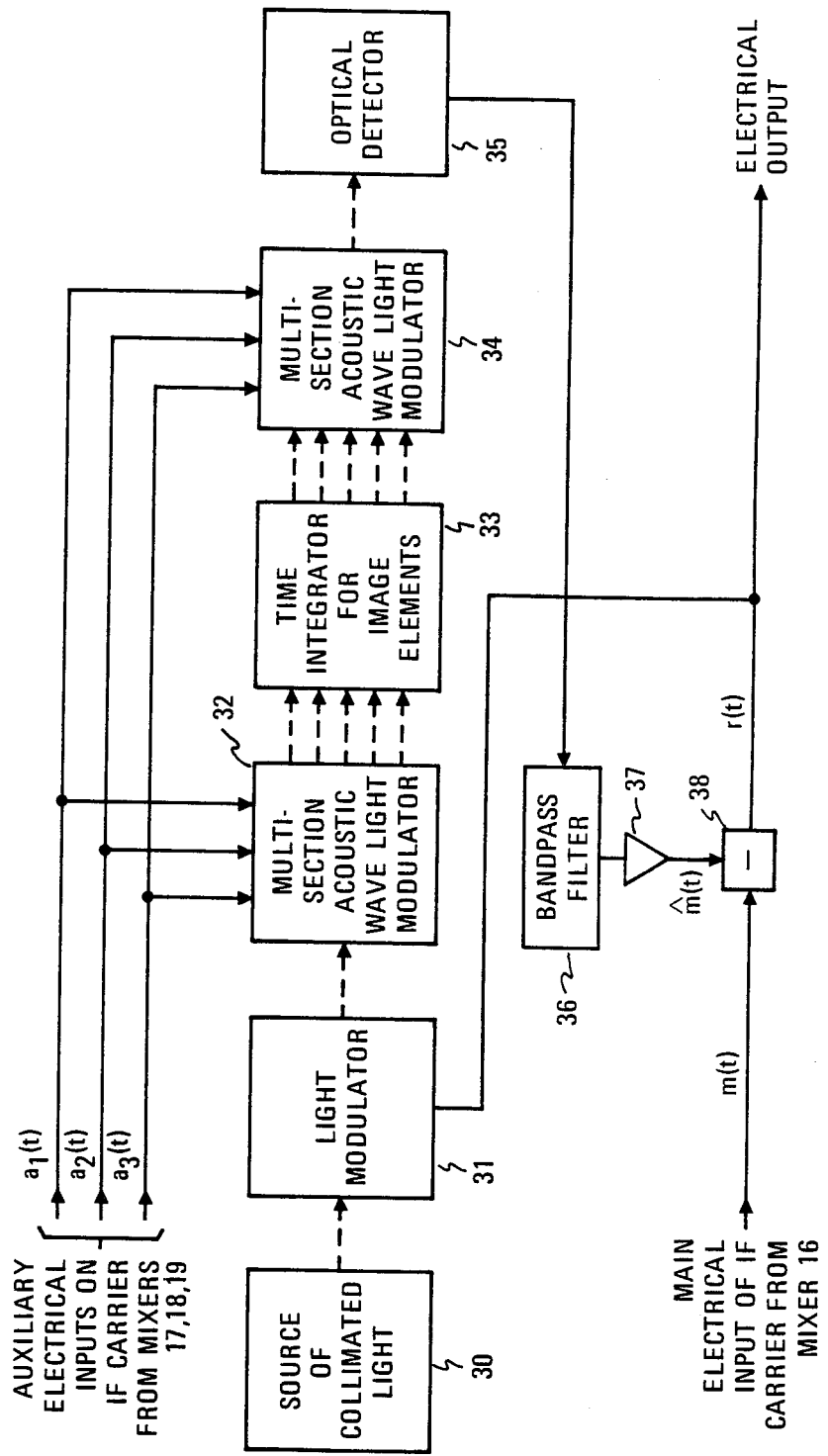
FIG. 2 is a block diagram of the novel acousto-optical adaptive signal processor.
Figure 4:
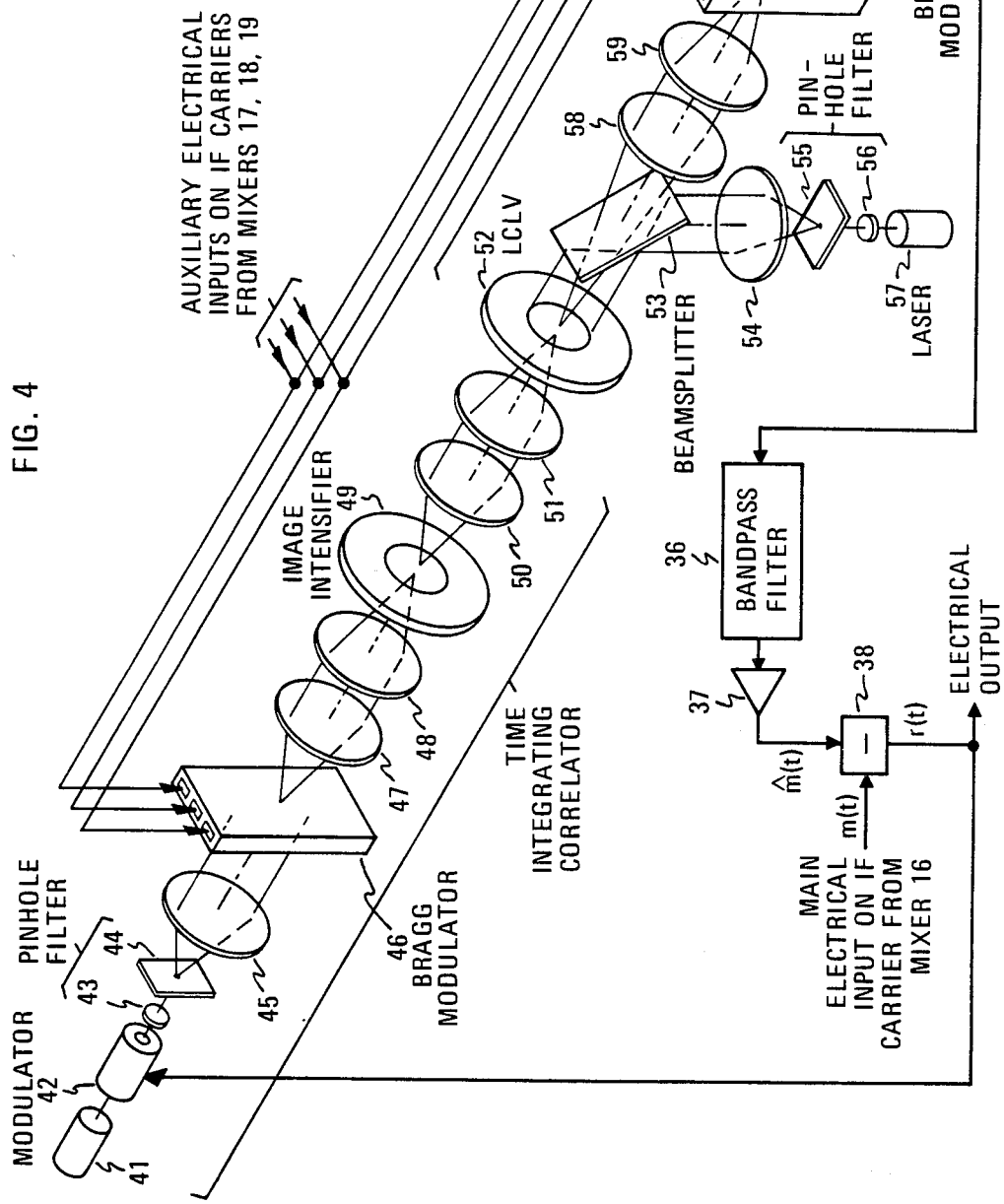
FIG. 4 is an optical schematic of an optical processor having the block diagram illustrated in FIG. 2.

The acousto-optical adaptive signal processor (AOAP) 20 is depicted in a simplified block diagram form in FIG. 2. One realization of the block diagram of FIG. 2 with identified optical components is illustrated in FIG. 4.

As seen in FIG. 2, the processor (20 in FIG. 1) consists of 9 elements, 3 of which are electrical elements (36, 37, 38) and 6 of which are optical elements (30–35). The inputs to the processor are the electrical inputs derived from the main antenna 11 and the auxiliary antenna 26, 27, 28 via the mixers 16, 17, 18, 19, respectively. These four input signals, which are modulated on a carrier at the intermediate frequency (e.g. 40 MHz) of the system, are respectively the main radar signal m(t) which contains interference and the three auxiliary signals $a_1(t)$, $a_2(t)$, $a_3(t)$, which contain the interference. The output of the processor is an electrical signal r(t), also borne on the IF carrier, which is the residual signal after subtraction of a predicted interference $\hat{m}(t)$ from the main radar return m(t) (containing interference). The predicted interference $\hat{m}(t)$ is derived by optically processing the auxiliary signals (containing the interference) and the residual signal r(t) in the six optical elements of the optical processor in a feedback loop which includes the three electrical elements.

The three electrical elements 36, 37, 38 of the optical processor (20 in FIG. 1) which are coupled to the optical elements (31, 35) are instrumental in subtracting the predicted interference $\hat{m}(t)$, which is derived from the optical processor at element 37 from the main return m(t) so as to obtain the residual output signal r(t). The feedback loops force the processor to converge toward an interference free signal (r(t)).

The electrical connections of the optical processor are as follows. The auxiliary inputs $a_1(t)$, $a_2(t)$, $a_3(t)$ derived via the mixers 17, 18 and 19 which contain the interference, after necessary amplification are coupled to two intermediate frequency optical modulators 32 and 34. The main output m(t) of the antenna 11 (containing interference) derived via the mixer 16 (usually after further amplification) is coupled to one input of the electrical subtraction means 38. The electrical output $\hat{m}(t)$ of the final optical element 35, which is the predicted interference, is then coupled via the band pass filter 36 and amplifier 37 to the second input of the subtractor 38. The subtraction means 38 forms a complex difference r(t) between these inputs. The output r(t), usually after further amplification is connected to the second optical element 31 of the optical processor. Assuming an optical path between optical elements 31 and 35, the electrical connections between elements 31 and 35 via 36, 37 and 38 complete a feedback loop.

The residual signal r(t), which appears at the output of the subtractor 38 contains the main radar signal essentially undiminished, but with the interference cancelled. The electrical output of the subtractor (38), after the feedback loop has stabilized, provides the electrical output of the processor 20 which is applied to the computer 21 for application to the target data display 22.

The six optical elements 30 to 35 of the optical processor may be divided into two groups. The first group 30, 31, 32 and 33 (listed in the order in which the light progresses through the elements) form a time integrating correlator and the second group 34, 35 form a space integrating correlator. The first element of the time integrating correlator is the source 30 of a collimated light beam. While this source need not be coherent in the strict sense, it is conventionally a laser as for instance a diode laser. The second element of the time integrating correlator is the light modulator 31 to which the collimated light beam from source 30 is applied. The intensity of the light beam is adjusted at an intermediate frequency rate (40 MHz) by means of an electrical signal provided from the subtraction means 38 as already noted. The light modulator 31 may typically be a Pockel's cell, or an acousto-optic cell in the the event that the source 30 is a conventional laser or it may be a portion of a diode laser operating circuitry, in which voltage is adjusted to modulate the amount of light output. The electrical signal (r(t)) provided to the modulator 31 is the main signal from which noise has been cancelled, which contains phase and amplitude information in relation to the 40 MHz intermediate frequency carrier of the signal. The optical output of the modulator 31 is in the form of a single beam of light, whose intensity is modulated by the electrical signal r(t). Thus, the optical output of the modulator 31 retains the information of the signal r(t), and retains the phase and amplitude information in relation to the original 40 MHz IF carrier. The source 30 should be adequately stable in frequency and intensity so as not to affect these variables.

The modulated beam of light, at the output of the modulator 31, is coupled to the multi-section acoustic wave light modulator 32 to which auxiliary electrical interference inputs from the mixers 17, 18, 19 are supplied. The acoustic wave light modulator 32 is, in the example, in three sections, each comprising a separate acousto-optical Bragg delay line modulator. For proper operation, it is assumed that the modulated beam from 31 impinges with equal intensities over the active regions of all three Bragg modulators. A Bragg modulator consists of an optically transmissive, acoustic delay line through which a beam of light is directed, provided with an electromechanical transducer at the electrical input end of the delay line to launch acoustic waves along the delay line to a remote end, with absorbers at the remote end to reduce backward reflections. When collimated light is passed through the optically accessible intermediate portion of the acoustic delay line while acoustic waves are passing through, the light will vary from point to point along the delay line creating an image of the acoustic wave progressing through the line.

The acousto-optical effect is well known, and is called the photo-elastic effect. In principle, the acoustic wave causes localized elastic deformations of the delay line, and these deformations adjust the index of refraction also in a localized manner. If certain angular restrictions are followed in the introduction and derivation of light from the Bragg modulator, the effect on the light input is a point-to-point modulation of the amplitude of the light output. Thus, assuming that the light entering the Bragg modulator 32 varies in amplitude according to r(t), a complex quantity; where $$r(t) = m(t) - \hat{m}(t), \quad (1)$$

and that an acoustic wave is launched at the electrical interference input ($a_i(t)$) of each section of the Bragg modulator 32, which may be denoted $$a_i(x - v_a t), \quad (2)$$

where x is the spatial coordinate along the delay line, and $v_a$ is the acoustic velocity, the notation denoting that $a_i(x - v_a t)$ is a travelling wave, then the Bragg modulator will form at each point a multiplication between a and r. It should be noted that both quantities are modulated upon the common IF carrier, and that due to the propagation delays along each delay line section, the time offset between the two functions increases as the acoustic wave (containing the interference) proceeds from the input transducer.

The output of the optical modulator 32 is thus a spatial pattern, formed by three adjacent Bragg modulator sections, each section acoustically modulated by a different electrical interference signal ($a_1(t)$, $a_2(t)$, $a_3(t)$) and having a point-by-point, amplitude variation, measured along the x coordinate. The output quantity may be expressed as a matrix of products $$a_i(x - v_a t) r(t) \quad (3)$$

The spatial pattern of the acoustic modulator is then imaged point-by-point on Time Integrator 33 for the Image Elements. The Integrator 33 may take several forms, including a simple phosphor screen as a portion of an image intensifier having a time constant on the order of 10 milliseconds. The preferred time integrator is a liquid crystal light valve, with a comparable time constant, and which when re-illuminated (typically with coherent illumination), produces an image, which is imaged upon the next optical element 34 in the optical processor.

The output of the time integrator (W,(x,t)) is thus an image in which each point (pixel) approximately represents the time integral of the product $$W(x,t) = \int_{T_o} a(x - v_a t) r(t) dt \quad (4)$$

where $T_o$ is 1/e decay time of the optical integrator. The output of the time integrating correlator (30-33) is now coupled to the space integrating correlator 34-35. The spatial pattern at the output of the time integrator 33, which may be regarded as "weights", is transferred by means of a laser (as seen in FIG. 4) from the time integrator 33 to the input surface of the multi-section acoustic wave light modulator 34. The acoustic wave light modulator 34 may be similar to the acoustic wave light modulator 32. The same auxiliary electrical inputs from the mixers 17, 18 and 19 supplied to the light modulator 32 are also supplied to the light modulator 34.

In the acoustic wave light modulator 34, the light pattern W(x,t) occurring over the surface of the modulator 34 is now multiplied by the electro-mechanically applied signals from the auxiliary inputs $a_1(t)$, $a_2(t)$, $a_3(t)$ containing the interference. The output of the optical modulator is thus an element-to-element multiplication of the "weights", which are a slowly changing stationary image by the instantaneous values of the interference signals, $$a_i(x - v_a t) \quad (5)$$

which progress at the acoustic velocity from the input transducer through the optical field of the modulator. The output quantity may be expressed as $$a_i(x - v_a t) W(x,t) \quad (6)$$

The output derived from the optical modulator 34 is then imaged upon a single optical detector 35. A suitable class of detectors is the photo diode. The photo diode selected should have the bandwidth required for processing a 40 MHz signal. The detector 35 produces a signal ($\hat{m}(t)$) varying at the IF carrier rate representing a spatial integration of the quantity appearing at the output of the modulator 34

$$\hat{m}(t) = \Sigma_i \int_{x\Delta} a_i(x - v_a t) W_i(x,t) dx \quad (7)$$

where $x\Delta$ is the interval of spatial integration across optical modulator 34.

The signal $\hat{m}(t)$ is thus a prediction of the interference derived from the auxiliary antennae by means of the space integrating correlation and time integrating correlation process and is suitable for subtraction from the return produced by the main antenna. To that end, the output of the optical detector 35 is coupled via the bandpass filter 36 to eliminate interference not relevant, is then reamplified by the amplifier 37 and subtracted in the subtractor 38 from the main electrical input. The electrical output r(t) obtained after the feedback loop has stabilized contains the main electrical signal less that interference.

Prior to a more detailed treatment of the novel optical system of FIG. 4, a functionally similar known non-optical tapped delay line system for adaptive cancellation as set forth in FIG. 3 may be considered as an introduction. This is one of a variety of wideband electronic adaptive systems, which have been built to perform interference cancellation in radar and sonar systems. Like the present system, precise complex values of correlation are produced by the signal processing system. These values are then multiplied with the delayed auxiliary (interference) signals to derive a version of the interference adjusted in amplitude and phase, which when subtracted from the main signal will cause interference cancellation. The residue of this subtraction is fed back into the adaptive loop thus formed, in the manner of a closed loop control system, which causes adjustment of the correlation coefficient to improve the cancellation. With proper integration in the control loop, a null is developed in regard to the interference, and the desired signal is passed without appreciable degradation.

The interference components can arrive reflected from various objects causing "multi-path" delayed components. Each resolvable time delay requires a new degree of freedom in the processing. In addition, if there are independent sources in the radar space, a new set of adaptive loops with multi-path capability must be provided for each of these sources. The result is often an expensively large number of electronic loops.

FIG. 3 shows the essentials of such a multi-loop electronic canceller. The auxiliary signals $a_i(t)$ are fed through tapped delay lines to account for any expected multi-path time delays which might be experienced in the main channel for the given interference component. Each of these taps is provided with a separate electronic loop. In the simplest situation, there may be only one auxiliary channel and one delay tap where the time delays for the jamming are exactly the same as they are in the main channel. This particular loop will be characterized by a high correlation between its delayed auxiliary signal and the multi-path delayed interference component found in the main signal $m(t)$. This correlation is developed by a multiplication between the main and auxiliary signals followed by a time integration. This develops a correlation "weight" W; which then multiplies the auxiliary signal, thus adjusting it in amplitude and phase so that a cancellation occurs with subtraction.

A whole set of loops spaced in time delay is made available for each auxiliary input in the system, which is a design response to the expectation of a multiplicity of jammers and propagation paths. Thus, a degree of freedom, i.e. a separate adaptive loop, is required in the most complete design for each combination of auxiliary input and time delay tap. The totality of signal outputs of the loops, each seeking its own null for its particular combination of input waveform and time delay, is summed (in the "ADD" bus) and the result is subtracted from the main channel output. Analysis shows that the required spacing in time delay for good cancellation is the reciprocal bandwidth of the system, assuming an unlimited offset time window (tapped delay line length) and quadrature sampling. For a finite window, i.e., a finite number of taps, the tap density must be even finer, according to interpolation theory. Further, enough delay and corresponding number of taps must be provided to accommodate multi-path components in the auxiliary signal, and the combination may exceed the primary signal delay by a large factor. As a result, in many practical cases, many hundreds of loops are required. Obviously, reduction of the tap density has a direct effect on the amount of equipment required. The resulting compromise of performance is often a difficult issue, and is avoided by the present optical approach.

A physical realization of the system depicted in the block diagram of FIG. 2 is illustrated in an optical schematic diagram provided in FIG. 4. In general, the optical component selection has been as described earlier except for additional detail. The optical processor comprises the elements 41 to 62. The first element in the system is a laser 41 whose output is coupled to light modulator 42 to which a signal corresponding to r(t) is applied as earlier noted. The laser 41 and modulator 42 correspond to the collimated light source 30 in FIG. 2. The output of the modulator 42 is coupled via a short focal length lens 43 followed by a pin hole filter 44 to a lens 45 of relatively longer focal length. The function of the elements 43 and 44 is to remove variations within the illumination while the function of the lens 45 is to extend even illumination over the active region of the element 46, which corresponds to the light modulator in FIG. 2. The lens 45 is typically a Bausch & Lomb 152 millimeter F/2.8 Baltar lens. Each pixel on the delay line of the optical modulator 46 is then imaged by the telecentric imaging optics 47, 48 upon the input surface of the image intensifier 49. The lenses 47 and 48 are typically Wollensak 241 millimeter F/4.5 Raptar lenses. In the practical application, these lenses may be spaced two focal lengths apart if it is desired to form a frequency plane and insert additional stops. In the usual case, and as a result of the thickness of the Bragg delay lines, the frequency stops are not necessary and the lenses may be brought closer together, or one can be eliminated. The image intensifier is an IT&T type 4108. The output of the image intensifier 49 is coupled by a second telecentric imaging optics comprising lenses 50, 51 upon a liquid crystal light valve 52 (the LCLV may be of Hughes Aircraft manufacture). A second laser 57, which may be helium neon laser from Spectra-Physics, is coupled via a second spatial filter consisting of a small focal length lens 56, a pin hole filter 55 and a larger focal length collimating lens 54 via one surface of the beamsplitter 53 on the back surface of the liquid crystal light valve 52. The liquid crystal light valve which produces alternatively light-reflective elements and darker non-reflective elements under the influence of the signal applied to the front face then selectively reflects the information stored over its surface through the beamsplitter 53 via a second telecentric lens set 58, 59 to the second acousto-optical delay line modulator 60. The full output area of the delay line modulator is then directed by the lens 61 upon the photodetector 62. The photodetector 62 may be an RCA type C30817.

An analysis of the FIG. 4 system follows. The light source is modulated by the cancelled main signal, which is a bandpass waveform having a spectrum centered at the IF carrier frequency. Thus, all of the light entering the system varies in amplitude according to the main signal after it has been cancelled, i.e. $r(t) = m(t) - \hat{m}(t)$. The light then passes through a Bragg cell delay line 46. The acoustic wave denoted $a_i(x - v_a t)$ launched in this cell is obtained from an auxiliary channel. The product function is imaged point-by-point on the photocathode of the image intensifier 49. This spatial pattern is transferred to the output phosphor screen of the image intensifier, which performs the desired time integration. It is presumed that the integration is characterized by an exponentially decaying time weighting function. For this application, a P1 phosphor was selected, providing a time constant on the order of 10 milliseconds. The spatial pattern thus developed represents the correlation function between a and r, over a time history corresponding to the exponential decay of the optical device. The correlation function is presented in the spatial coordinate as a continuous function of signal offset or time delay. This corresponds to the "correlation weight" as a function of tap location in the more conventional tapped delay line architecture. If we denote this weight function as W(x,t) we have $$W(x,t) = \frac{1}{T_o} \int_{-\infty}^{t} a(x,\tau) r(\tau) e^{\left(\frac{-(t-\tau)}{T_o}\right)} d\tau \qquad (8)$$

where
- t = current time
- $\tau$ = time history variable
- $T_o$ = 1/e decay time of optical integrator
- x = position along delay line or delay line image, representing correlation offset time.

The relation between correlation offset time t' and delay line position x is given in terms of the acoustic velocity $v_a$ as $$t' = x/v_a \qquad (9)$$

Both a(x,t) and r(t) are carrier borne signals. The carrier is the key to handling signals in both amplitude and phase which are thus mathematically representable as complex quantities. The IF carrier therefore assumes the role of the original radar or system propagation carrier. Thus, if $\bar{a}_m$ and $\bar{r}_m$ are the complex modulation signals, a and r may be represented in the following way:

$$r(t) = \bar{r}_m e^{j\omega_a t} + r_o + \bar{r}_m^* e^{-j\omega_a t} \qquad (10)$$

where
- $\bar{r}_m$ = complex modulation signal
- $\bar{r}_m^*$ = conjugate of $r_m$
- $\omega_a$ = acoustic carrier frequency in radians per second.

Similarly, $$a(x,t) = a\left(t - \frac{x}{v_a}\right) = \bar{a}_m\left(t - \frac{x}{v_a}\right) e^{j\omega_a(t - \frac{x}{v_a})} + \qquad (11)$$

$$a_o + \bar{a}_m^*\left(t - \frac{x}{v_a}\right) e^{-j\omega_a(t - \frac{x}{v_a})}$$

This form includes the case of optical modulation in the delay line. Phase and amplitude modulation are differentiated by the relative phase of the $a_m$ terms and $a_o$. The light beam, bearing signal r, passes through the delay line which contains a, and thus a product is formed. This product is imaged on the image intensifier 49 and integrated there with time constant $T_o$, according to equation (8). The product $a(x-v_a t) r(t)$ from (10) and (11) forms 9 terms. These terms all have a factor $$e^{\pm jn\omega_a t}, n=0, 1, 2. \qquad (12)$$

For n=1, 2 the term is characterized by an acoustic carrier frequency, and hence will not survive the integration. Only the three n=0 terms are thus of interest, and these lead to $$W(x,t) = \bar{W}_o + \bar{W}_m e^{j\omega_a x/v_a} + \bar{W}_m^* e^{-j\omega_a x/v_a} \qquad (13)$$

where
$W_o = r_o a_o$ = optical bias term and $$\bar{W}_m = \frac{1}{T_o} \int_{-\infty}^{t} \bar{a}_m^*\left(\tau - \frac{x}{v_a}\right) \bar{r}_m(\tau) e^{\frac{-(t-\tau)}{T_o}} d\tau \qquad (14)$$

This is recognized as the complex correlation function between $\bar{a}_m$ and $\bar{r}_m$, involving exponentially weighted integration. Equation (2-5) is equivalent to $$W(x,t) = \bar{W}_o + 2|W_m|\cos\left(\omega_a \frac{x}{v_a} + \phi_w\right) \qquad (15)$$

where
$\phi_w$ = phase angle of correlation weight.

This will produce optical amplitude or phase modulation depending on the relative phase of $\bar{W}_o$. Since the delay line is an optical phase modulator, and $\bar{W}_o$ is the product of $r_o$ and $a_o$, equation 11 and therefore equation 13 implies optical phase modulation. This condition may be converted to an equal combination of amplitude and phase modulation by eliminating one sideband, e.g. the third term in equation 11. The spectrum of the function (corresponding to the acoustic carrier) is spatially displaced in the focal plane of lens 47. The extra term can thus be eliminated in the optical spatial frequency plane, between lenses 47 and 48 with a simple optical stop. In the case of a Bragg line, or a "thick" line, when adjusted at the Bragg angle, only one strong diffracted optical order is generated. This order is reconstructively related to the input beam over the volume of the delay line. Thus, essentially only two orders emanate from the delay line, and the desired amplitude modulation resulting from the combination of these two orders is automatic, without the need of a stop.

The W(x,t) pattern developed by the integrating device (image intensifier 49) is now imaged to the LCLV 52, which in turn is imaged to a second optical delay line modulator 60. Again a product is formed. In the case of an optically coherent system, the required amplitude modulation can again be provided by the elimination of an optical order.

The product function W(x,t) and a(x,t) is spatially integrated across delay line 60 by lens 61 which is focused on the output detector 62. The function launched into 60 is identical to the signal in 46. This can be understood by referring to FIG. 3, in which the generic architecture of an adaptive loop is shown, with the same delay line feeding both correlators. Thus, we have the detector signal:

$$\hat{m}(t) = \int_{x\Delta} a(x,t) W(x,t) dx \qquad (16)$$

where
$x\Delta$ is the interval of spatial integration across DL2.

This again produces 9 terms. Now all but three of the terms have a spatial frequency corresponding to the acoustic delay line carrier frequency. The integration expressed by (16) will reject these spatial carrier-borne terms, since this is a spatial integration. The result is $$\hat{m}(t) = a_o \bar{W}_o + \frac{e^{j\omega_a t}}{T_o} \int_{x\Delta} \bar{P}_m dx + \frac{e^{-j\omega_a t}}{T_o} \int_{x\Delta} \bar{P}_m^* dx \qquad (17)$$

where $$\bar{P}_m = \bar{a}_m\left(t - \frac{x}{v_a}\right) \int_{-\infty}^{t} \bar{a}_m\left(\tau - \frac{x}{v_a}\right) \quad (18)$$

$$\bar{r}_m(\tau)e^{\frac{(-t-\tau)}{T_0}} d\tau$$

The result makes clear that a coherent phase-sensitive operation is accomplished. This is to say that the correct form of the complex correlation function between a and r is indicated by the integral, and the complex "weight" is used to adjust the amplitude and phase of $a_m$ by multiplication for subsequent subtraction and cancellation of the input signal.

It is noteworthy to observe the manner in which the complex value of the signal is transferred through the system, with phase preserved. This happens because the signals are borne on either a time or space carrier throughout, in the manner of a narrow band signal. The first signal applied to the system is the modulation on the light source. The phase of this signal is with respect to an assumed reference carrier frequency, which is also the acoustic carrier in the delay lines. The correlation operation between the signal applied to the light source, r, and the signal 46, a, senses the phase between r and a. This phase information is imparted to the spatial signal developed in the time integrator (image converter). Here the physical position of the spatial carrier cycles with respect to an assumed position denote the phase of the correlation pattern (W). As the phase difference between r and a changes, the position of the carrier cycles in W will move accordingly. The dual of this sequence occurs in the second optical section. Here the spatial W-pattern interferes optically with the traveling acoustic wave in 60, which upon spatial integration by the final lens, causes a time carrier to appear in the detector 62. The time phase of this output depends on the spatial position of the cycles in the W-function, and the phase of the acoustic wave in 60. Thus, a transfer of signal is made from the time domain to the space domain and back again, always with the phase being coherently transferred at each point.

Inspection of 17 and 18 reveals that the proper adaptive operation is realized. Signal r is inspected for a partial containment of a by a complex cross-correlation of r with a at an arbitrary offset time of $x/v_a$. This correlation weight is applied to a, again offset by $x/v_a$. The result is the correct subtraction for an interference component delayed by $x/v_a$. Finally, this result is integrated over all values of x that are in an expected range to develop the complete subtraction signal (equation 17).

The optical system performs two critical optical transformations upon the IF carrier borne information while maintaining essential linearity. This occurs in the true sense even though it passes through two square law devices. The first square law device is the image intensifier 49. The LCLV then converts the intensity function back to an optical amplitude. The second square law device is the optical output detector 62.

The mathematical proof is as follows:

The two orders developed by the Bragg diffraction in the delay line appear collimated and at a relative mutual angle corresponding to the acoustic spatial frequency in the image plane. Thus, the relative spatial phase of the two orders varies at a spatial rate which is the acoustic spatial frequency. The coherent sum of the two orders can then be expressed as:

$$sum = c + jse^{j\theta_a} \quad (19)$$

where
  c is the 0 Bragg order, and
  s is the diffracted Bragg modulator, $$\theta_a = 2\pi \frac{(x - v_a t)}{\Lambda} + \phi_a \quad (20)$$

$\phi_a$ = acoustic signal modulation phase

The light waves are detected by the image intensifier (or other detecting device) which can be adequately modeled as a square law detector. The light intensity is given as $$I = \frac{1}{2}(c + jse^{j\theta_a})(c^* - (js)^*e^{-j\theta_a}) \quad (21)$$

For this argument, we assume that c and s are real functions. Thus, we have $$I = \frac{1}{2}(cc^* + ss^* + jc^*se^{j\theta_a} - jcs^*e^{-j\theta_a}) \quad (22)$$

$$= \frac{c_0^2}{2}\left(1 + 2\cos\frac{\phi_m}{2}\sin\frac{\phi_m}{2}\sin\theta_a\right)$$

Hence:

$$\frac{I}{c_0^2} = \frac{1 + \sin\phi_m\sin\phi_a}{2}$$

In the above expression, the presence of the factor $\sin\phi_a$ tells us that the intensity varies as an approximately linear function of the acoustic carrier, and this variation or carrier is multiplied by $\sin\phi_m$. The function $\phi_m$ is here regarded as the signal amplitude (total phase shift across the Bragg line due to the photoelastic effect). If $\phi_m$ is appreciably less than 1 radian, the modulation amplitude becomes linear with signal amplitude as desired. This variation appears around a bias term equal to $\frac{1}{2}$.

In a similar way, two optical orders are brought into collimated coincidence by the second delay line 60, and they interfere in the output detector, which is also a square law device. The difference in optical frequencies appears in linear form due to the mixing process in the detector. The detector output current is proportional to optical input intensity which is the square of optical amplitude. Thus, the final signal appears linearly as the carrier frequency component of the electrical current and is obtained by the bandpass filter 36 and the amplifier 37 which follow the detector.

In FIG. 4, the symmetry may be noted between the time-integrating correlator and the space integrating correlator. In the optical form of these correlations, one is the backward dual of the other. This suggests the reuse of the same optical configuration to provide both correlation functions. In other words, the same Bragg delay line modulator may be reused for the two delay line functions required by means of beamsplitters to fold the system into the Bragg modulator for a second time.

Figure 5:
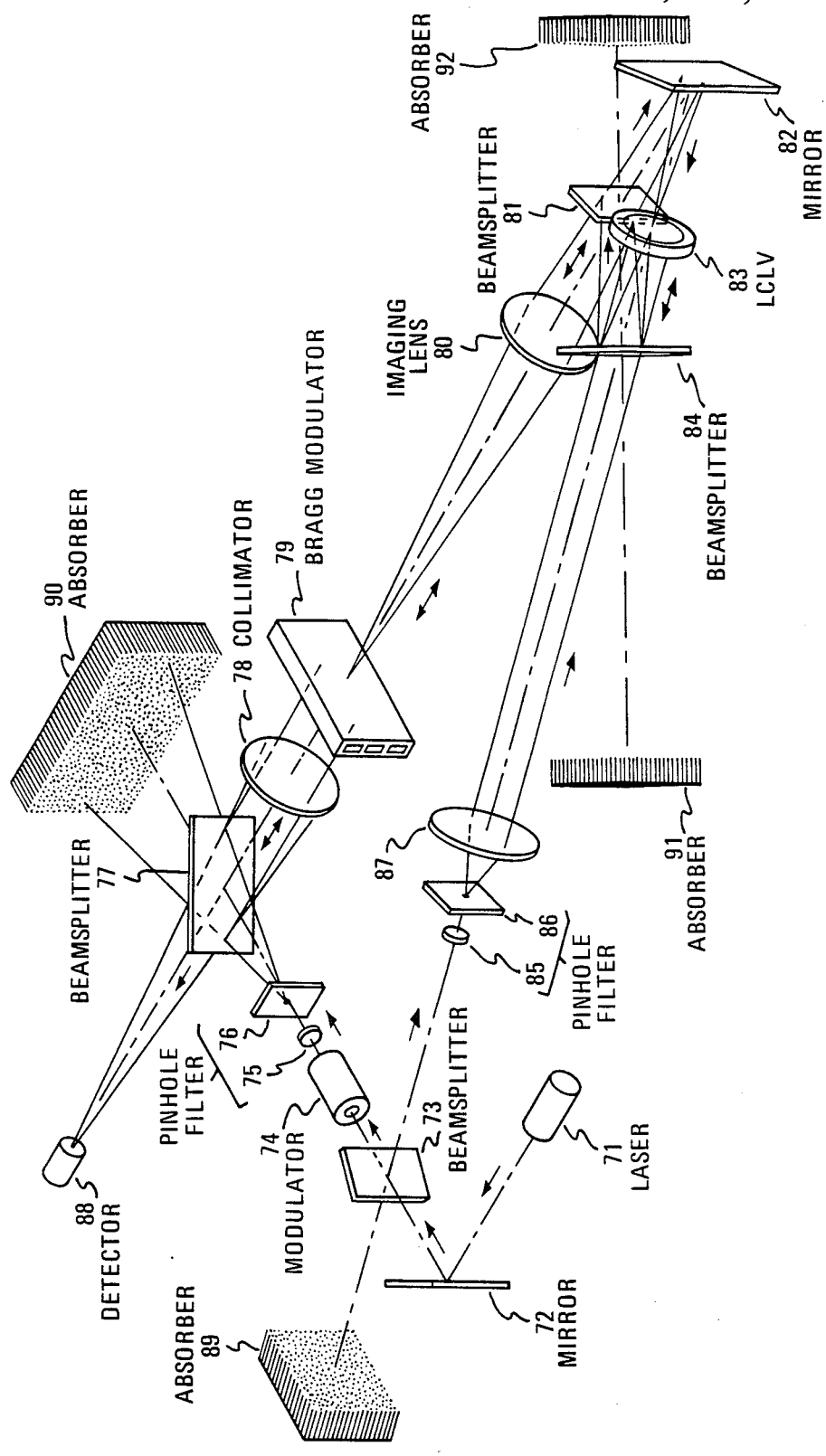
FIG. 5 is an optical schematic of a folded optical processor similar in principle to that illustrated in FIG. 4 but reusing certain major optical components.

FIG. 5 shows the arrangement by which an entire optical section can be used backwards a second time to implement the space integrating correlator. The arrangement provides common mode operation of the two passes, and provides precise geometrical matching which is required for the proper registration of the system. It is assumed that the light travelling in both directions will be of the same wavelength to provide this precise match. It might be possible to achieve satisfactory operation even with two different wavelengths, but the common wavelength arrangement is to be preferred. Thus, the most likely selection of wavelength is in the region of the LCLV sensitivity, which includes the green wavelength line of the argon ion laser (71), i.e. 514.5 nm. In the present arrangement two beamsplitters (81, 84) and a mirror 82 surround the LCLV so that the light travelling left to right in the diagram from beamsplitter 77, via 78, 79, 80, beamsplitter 81, morror 82 represents the time integrating correlator function and this light is brought to the photoconductive (input) plane of the LCLV 83. Further, the modulated laser light, which reflects off the liquid crystal (output) plane of the LCLV 83 is injected back into the system in precisely the opposite direction (via beamsplitter 84, beamsplitter 81, 80, 79, 78, 77) to the detector 88 to complete the space-integrating correlator function. A single imaging lens (80) then provides an image relationship simultaneously between the Bragg modulator 79 and the photoconductor input plane to the LCLV 83, and between the output plane of the LCLV 83 and the Bragg modulator 79.

An optically sequential description of the system follows. An argon ion laser 71 at 514.5 nm wave length is used to illuminate the system. The laser output, after deflection by mirror 72 is divided into two beams by the beamsplitter 73. One of these beams passes through an AO type time modulator 74 which imposes the signal r(t), which is understood to be modulated on an IF carrier, as a time modulation on the light beam. The beam then passes through a conventional pinhole-spatial filter system (75, 76) to spatially "clean" the beam and expand it. As it expands, the beam is intercepted by a beamsplitter 77, which by reflection directs the beam into the main optical channel. This may be a 50—50 splitter, in which case an equal amount of light is transmitted and reflected. The light which is transmitted is discarded in an absorber 90. The beam which is reflected is collimated by a collimating lens 78. The "clean" collimated light then passes through the Bragg delay line modulator 79 which is a delay line which operates in the Bragg mode, thus producing primarily a 0 order and a single first order of diffraction, with respect to the acoustic carrier propagating in the delay line Bragg modulator. Since essentially only two orders are produced by the Bragg modulator, a frequency plane stop is not needed, and a single 1:1 lens can be used to image the delay line on the input plane of the LCLV 83. (The distance from 79 to lens 80 is $2F_i$, and from 80 to the input plane of 83 is $2F_i$, where $F_i$ is the focal length of lens 80.) The light which is reflected by beamsplitter 81 is discarded in the absorber 91 or 89, or back into the source laser 71.

The LCLV 83 modulates the light arriving on the output plane in accordance with the carrier-borne information impinging on the photoconductor input plane as just described. The light so modulated on the liquid crystal side is derived as the second beam formed by the beamsplitter 73, which is also processed through a pinhole-spatial filter unit 85, 86, and a collimator 87. After collimation, the light beam travels through a beamsplitter 84 to the output plane of LCLV 83. Light from laser 71 which is reflected from the beamsplitter 84 is discarded in the absorber 91.

The modulated light (from LCLV 83) is reflected by the beamsplitter 84 and 81 back into the primary optical channel consisting of the previously defined components 80, 79, 78 and 77, traveling in a direction reverse to that originally described. (The distance from the output plane 83 via 84, 81 to lens 80 is $2F_i$.) Light which is transmitted by beamsplitter 81 is discarded in absorber 92. The backward traveling light which is transmitted by beamsplitter 77 is focused by the collimator 78 into the detector 88, and this becomes the doubly correlated time waveform ($\hat{m}(t)$) which is the output of the optical channel. As described in previous teaching, this function is electronically subtracted from the main channel input to the system to form a closed loop. Light which is reflected by beamsplitter 77 is discarded in the laser input section of the system.

The beamsplitters 81 and 84, and the mirror 82 provide the required symmetry of the system around the LCLV 83, and by imaging cause a virtual coincidence between the input and output planes of the LCLV. Exact coincidence can be achieved by angular and lateral adjustment of the mirror 82.

Thus, light travels in the described manner from the laser 71 to the input plane of the LCLV 83, and in this pass constructs the proper output of the time integrating correlator, i.e. a spatial correlation pattern in the continuum is presented to the input plane of the LCLV, which represents the cross-correlation between the main signal r(t) and the auxiliary electrical signal (or signals) denoted $a_i(t)$ supplied to the Bragg modulator transducers. The action of the LCLV 83 then causes this pattern to be transferred to the laser beam arriving at the output plane of the LCLV. This light then progresses from the LCLV back via the beamsplitters 84, 81 through the imaging optics 80 and the Bragg modulator 79. In this backward pass, the function of the space integrating correlator is constructed, in which the previous spatial correlation pattern is correlated again with the auxiliary electrical signal (or signals) $a_i(t)$ in the Bragg modulator 79 in the manner of a transversal filter. The time function which results is converted to an electrical signal by the output detector 88 of the system.

The four beamsplitters 73, 77, 81 and 84 may all be of a 50—50 ratio for nominal system performance. Departure from an "ideal" ratio will cause some degradation of the output signal-to-noise ratio. The laser light which is reflected from the LCLV 83 executes five passes through the various beamsplitters, resulting in an attenuation of 1/32, and the input light which arrives at the photoconductor input of the LCLV executes three passes through beamsplitters, resulting in an attenuation of ⅛. The 4 to 1 advantage of the input pass may be approximately appropriate for an "ideal" signal-to-noise ratio since it is expected that the output detector 88 will be of relatively greater sensitivity than the LCLV 83. Available argon lasers (approx. 100 m watts) provide more light than is needed in this processor, and overall attenuation is accordingly necessary with lasers of like power level.

The optical design should minimize the reflection of input light into the output configuration (88). This can happen if the forward-pass light which is transmitted and reflected by beamsplitter 81 is directed to and reflected from the two sides of the LCLV 83 by the beamsplitter 84 and mirror 82. These reflections will then be redirected (with beamsplitter attenuation) backward through the system to the output detector (88).

This problem is not particularly severe since the only information contained in such reflections is the instantaneous signal which modulates the laser beam, without integration. The unintegrated signal is, of course, the main signal designated r(t). If this is fed back to the system output, particularly when at a low level, it will cause only a minor variation of the system gain for the total signal. To avoid the feedthrough problem, the input optical path can be turned slightly with respect to the axis of the LCLV to prevent any strong reflections from progressing backward through the system. Analysis also shows that the reference signal a(t) is not fed back for similar backward reflections into the output detector 88 in such a manner as to cause interference.

Figure 6:
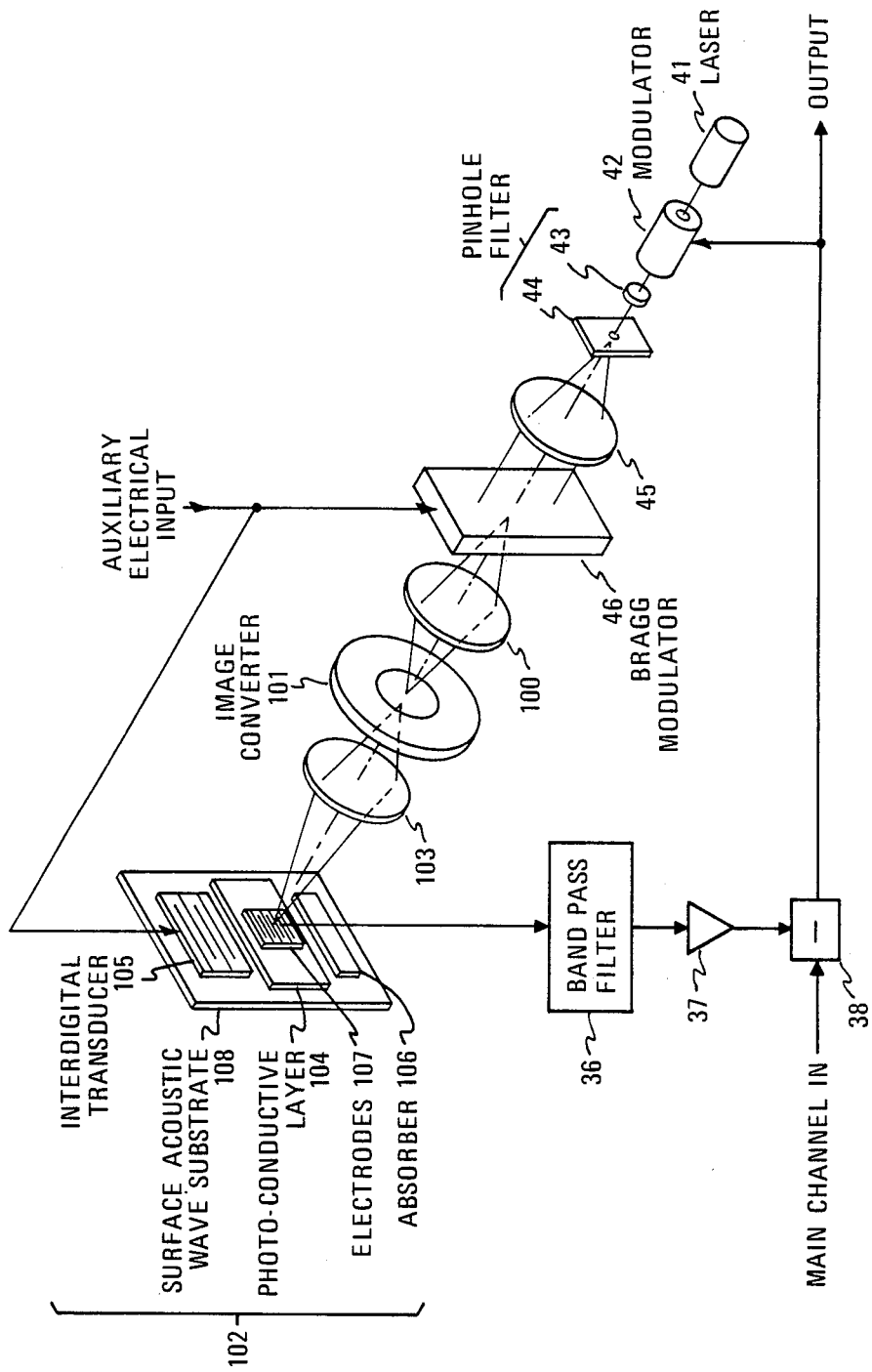
FIG. 6 is an optical schematic of an optical processor in which a single surface acoustic wave optical interaction device provides the space integrating correlation function.

FIG. 6 shows a third optical system in accordance with the invention in which a single device (102) performs the space integrating correlation function and may also, in the case of a further modification described in the next paragraph, perform the time integration. The optical system of FIG. 6 may be similar to that illustrated in FIG. 4, starting with the laser 41, and including the optical elements 42–46 and the electrical elements 36–38. The output of the first acousto-optical delay line modulator 46 is coupled by a single lens 100 to an image converter 101. The image converter 101 should have the property of converting the light impinging upon its input plane to a portion of the spectrum suitable for maximum sensitivity of the photoconductive layer of the output device 102. The output plane of the image converter 101 is imaged by means of the lens 103 upon the photoconductive input surface of the surface acoustic wave optical interaction device 102. The device 102 utilizes the joint sensitivity of the conductivity of a photoconductive layer 104 to the surface acoustic waves launched in the substrate 108 by the interdigital transducer 105 (and absorbed by the absorber 106) and to light impinging on the photoconductive layer 104, which is provided with interdigital fingers 107. When a suitable bias (not shown) is provided between the interdigital fingers 107, acoustic effects and light effects jointly interact with the conductivity of the photoconductive layer to produce a current. The current produced, which is a sum of the current over the entire active area, is an integration of the "third" pattern. This current is coupled via the bandpass filter 36, and amplifier 37 to the subtractor 38 where the residual output r(t) appears. The system, as described, is also quite compact, and may use a diode laser.

A more compact optical processor may be constructed by using a laser of suitable wavelength for photoconductor sensitivity, and by eliminating the image converter 101, and allowing the photoconductor 104 to provide the integration function in the time integrating correlator. In that event, the coupling optics may be greatly simplified, and may even involve eliminating lenses 100 and 103, and mounting the delay line modulator 46 in close proximity to the electrodes 107 on the photo layer 104. A similar simplification may occur in respect to the light modulator 42 provided that the design can modulate a large enough area to cover the active regions of the delay line modulator 46.

A device of the nature of the surface acoustic wave optical interaction device herein described has been proposed for performance of a direct electronic Fourier transformation by Messrs. Kornreich and Kowel et al in the Proceedings of the IEEE, Vol. 62, pages 1072–1087, August 1974.

What is claimed is:

1. A processor for use in an echo ranging or communication system in which a signal is received by a directional main antenna with possible interference including multi-path signals, said main antenna signal after conversion to a modulation on a carrier of intermediate frequency being denoted m(t); and in which system at least one auxiliary, substantially less directional antenna (i) is provided for intercepting interference, said auxiliary antenna signal after conversion to a modulation on said carrier being denoted $a_i(t)$, said processor generating a predicted interference signal $\hat{m}(t)$, modulated on said carrier at an appropriate phase and amplitude for interference cancellation, and effecting said cancellation, said processor comprising:

A. an optical time integrating correlator for deriving at least one correlation function (or weight) $W_i(x)$, where x is proportional to time delay, by correlating a residual signal r(t), approximating said main signal with the interference therein cancelled with each auxiliary signal $a_i(t)$ comprising:

(1) a source of quasi-coherent optical radiation in the visible or near visible spectrum, (2) a first modulator for modulating said optical radiation with said residual signal r(t), said signal (r(t)) being of prescribed phase and amplitude in relation to said carrier, (3) acoustic wave light modulation means to which said modulated light output is coupled and to which said auxiliary signals ($a_i(t)$) are coupled to excite acoustic waves, said modulation means providing point by point multiplications between said optical and acoustic waves to form a first spatial pattern of products $$a_i\left(t - \frac{x}{v_a}\right) \cdot r(t)$$

where
x is a coordinate measured in the direction of propagation of said acoustic waves, and
$v_a$ is the acoustic velocity in said acoustic wave light modulation means, said first pattern retaining prescribed phase and amplitude signal information as modulations on said carrier in a spatial format, (4) time-integrating means coupled to the output of said acoustic wave light modulation means, having a time constant adequate for executing a time integral of each point of said first spatial pattern to obtain at least one complex correlation function W(x), as a second spatial pattern, $$W(x) = \int_{T_o} a_i\left(t - \frac{x}{v_a}\right) \cdot r(t)\, dt$$

where
$T_o$ is 1/e decay time of integration, and
x is the coordinate measured in the direction of propagation of said acoustic waves, transformed to said time integrating optical means, said second spatial pattern retaining phase and amplitude signal information as modulations on said carrier in said spatial format;

B. a space-integrating optical correlator for correlating each auxiliary signal ($a_i(t)$) while it traverses an optical aperture as an acoustic wave with said second spatial pattern of correlation functions (or weights) $W_i(x)$ to derive the predicted interference signal $\hat{m}(t)$, comprising:

(1) acoustic wave light modulation means to which said optical output of said time-integrating optical means is coupled and to which said auxiliary signals $a_i(t)$ are coupled to excite acoustic waves, said modulation means providing point by point multiplications between said optical and acoustic waves to form a third spatial pattern of products $$a_i\left(t - \frac{x}{v_a}\right) \cdot W(x)$$

where x is the coordinate measured in the direction of propagation of said acoustic waves, said third pattern retaining prescribed phase and amplitude signal information, as modulations on said carrier in a spatial format, (2) a space integrating optical detector to which said third spatial pattern is coupled, said optical detector having adequate bandwidth to accommodate said modulated spatial carrier, said optical detector producing an output $\hat{m}(t)$ $$\hat{m}(t) = \sum_i \int_{x\Delta} a_i\left(t - \frac{x}{v_a}\right) W(x)\, dx$$

where $x\Delta$ is the interval of spatial integration in which said predicted interference signal is converted from said spatial modulation back to a temporal modulation on said carrier, said predicted interference signal ($\hat{m}(t)$) approximating the interference in said main signal in respect to phase and amplitude, and C. cancellation means in an adaptive feedback path for obtaining said residual signal $r(t)$ as a modulation on said carrier, comprising:

(1) a bandpass filter whose input is coupled to the output of said optical detector for restricting the predicted interference signal $\hat{m}(t)$ to the useful signal band about said carrier, and (2) subtraction means having an input coupled to said bandpass filter for application of said predicted interference signal $\hat{m}(t)$, said main signal $\hat{m}(t)$ being coupled to said other input, said subtraction means obtaining the complex difference denoted $r(t)$, between the main carrier-borne signal $m(t)$ and said predicted interference signal $\hat{m}(t)$, said difference ($r(t)$) being coupled to the first modulator, as earlier recited, to complete a feedback loop in which said predicted interference signal $\hat{m}(t)$ is caused to adaptively converge toward equality with the noise present in said main signal, said convergence causing said residual signal $r(t)$ to approach equality to the main signal without said interference.

2. A processor as set forth in claim 1 wherein said acoustic wave delay line light modulation means consists of two Bragg modulators wherein the input to each results in essentially a single diffracted order in addition to the zero, non-diffracted order in the output, each modulator having one section for each auxiliary signal.

3. A processor as set forth in claim 2 wherein said time integrating optical means is an image intensifier.

4. A processor as set forth in claim 3 wherein a liquid crystal light valve is provided, illuminated by a source of quasi-coherent optical radiation in the visible or near visible spectrum, for coupling said second spatial pattern from said time integrating optical means to said second acoustic wave light modulator.

5. A processor as set forth in claim 2 wherein said time integrating optical means is a liquid crystal light valve, illuminated by a source of quasi-coherent optical radiation in the visible or near visible spectrum, for coupling said first spatial pattern from said Bragg modulator to said second Bragg modulator to form said third pattern.

6. A processor as set forth in claim 1 wherein said acoustic wave light modulation means for formation of said first spatially distributed pattern and said acoustic wave light modulation means for formation of said third spatially distributed pattern are one and the same acoustic wave light modulator.

7. A processor as set forth in claim 6 wherein said time integrating optical means is a liquid crystal light valve with a photoconductive input plane and a liquid crystal output plane, and wherein optical coupling means are provided for coupling said first pattern from said acoustic wave light modulator to the input plane of said liquid crystal light valve, said second pattern appearing on the output plane of said liquid crystal light valve, and for coupling said second pattern appearing at the output plane of said liquid crystal light valve to said acoustic wave modulator.

8. A processor as set forth in claim 7 wherein said optical coupling means includes a first and a second beamsplitter and a mirror; the first beamsplitter and said mirror providing a first folded optical path coupling said acoustic wave light modulator to the photoconductive input plane of said liquid crystal light valve, and said first and second beamsplitters providing a second folded optical path coupling the output plane of said liquid crystal light valve to said acoustic wave light modulator.

9. A processor as set forth in claim 8 wherein said optical coupling means includes a third beamsplitter for coupling light from said source of quasi-coherent optical radiation to said acoustic wave light modulator and for coupling said third pattern appearing in said acoustic wave modulator to said space integrating optical detector.

10. A processor as set forth in claim 9 wherein said optical coupling means includes a fourth beamsplitter for coupling light from said source of quasi-coherent optical radiation via said third beam-splitter to said acoustic wave light modulator and for coupling light from said quasi-coherent optical radiation via said second beamsplitter to the output plane of said liquid crystal light valve for transfer of said second pattern to said acoustic light modulator.

11. A processor as set forth in claim 10 wherein said optical coupling means includes an imaging lens for transferring said first pattern from said acoustic wave light modulator to the input plane of said liquid crystal light valve and for transferring said second pattern at the output surface of said liquid crystal light valve to said acoustic wave light modulator.

12. A processor as set forth in claim 11 wherein the distance between said imaging lens via said first beamsplitter and said mirror to the input surface of said liquid crystal light valve is equal to the optical distance from the output surface of said liquid crystal light valve via said second beamsplitter to said imaging lens whereby said second pattern is arranged to correspond precisely with said first pattern upon said acoustic wave light modulator.

13. A processor for use in an echo ranging or communication system in which a signal is received by a directional main antenna with possible interference including multi-path signals, said main antenna signal after conversion to a modulation on a carrier of intermediate frequency being denoted $\hat{m}(t)$; and in which system at least one auxiliary, substantially less directional antenna (i) is provided for intercepting interference, said auxiliary antenna signal after conversion to a modulation on said carrier being denoted $a_i(t)$, said processor generating a predicted interference signal $\hat{m}(t)$, modulated on said carrier at an appropriate phase and amplitude for interference cancellation, and effecting said cancellation, said processor comprising:

A. an optical time integrating correlator for deriving at least one correlation function (or weight) $W_i(x)$, where x is proportional to time delay, by multiplying the residual signal r(t), (approximating said main signal with the interference therein cancelled) in optical form with at least one auxiliary signal $a_i(t)$ in acoustic form in an acoustic wave light modulator to obtain point by point multiplications between said optical and acoustic waves to form a first spatial pattern, and executing a time integral of each point of said first spatial pattern in an optical integrator to obtain the complex correlation functions (or weights) $W_i(x)$, as a second spatial pattern, x being a coordinate measured in the direction of the propagation of said acoustic waves, said spatial pattern retaining phase and amplitude signal information as modulations on said carrier in a spatial format;

B. a space integrating optical correlator for deriving the predicted interference signal $\hat{m}(t)$, by multiplying the correlation functions (or weights) $W_i(x)$ in the optical form of said spatial pattern with the auxiliary signals $a_i(t)$ in acoustic form in an acoustic wave light modulator to obtain point by point multiplications between said optical and acoustic waves to form a third spatial pattern, said third pattern retaining prescribed phase and amplitude signal information as modulations on said carrier in a spatial format, and executing a spatial integral of all points of said third spatial pattern in an integrating optical detector to obtain the predicted interference signal $\hat{m}(t)$, approximating the interference in said main signal in respect to phase and amplitude, and C. cancellation means in an adaptive feedback path for obtaining said residual signal r(t) as a modulation on said carrier by filtering the output of said optical detector to restrict the predicted interference signal $\hat{m}(t)$ to the useful signal band about said carrier, and subtraction means having an input coupled to said bandpass filter for application of said predicted interference signal $\hat{m}(t)$, said main signal m(t) being coupled to said other input, said subtraction means obtaining the complex difference denoted r(t) between the main carrier-borne signal $\hat{m}(t)$ and said predicted interference signal $\hat{m}(t)$, to complete a feedback loop in which said predicted interference signal $\hat{m}(t)$ is caused to adaptively converge toward equality with the noise present in said main signal, said convergence causing said residual signal r(t) to approach equality to the main signal without said interference.

14. A processor as set forth in claim 13 wherein a surface acoustic wave optical interaction device forms said space integrating optical correlator, said interaction device comprising:

a photoconductive layer in which the correlation function (or weight) $W_i(x)$ is applied in optical form of said second spatial pattern to said layer in which the auxiliary signals $a_i(t)$ are applied in surface wave acoustic form to said layer to obtain point by point conductances having a term equal to a multiplication between said optical and acoustic quantities to form said third spatial pattern, and means including a voltage source for producing a current through said photoconductor layer, said current having a component at the carrier frequency equal to the integral of the conductances of the points of said third spatial pattern for deriving the predicted interference signal $\hat{m}(t)$.

15. A processor as set forth in claim 13 wherein the same surface acoustic wave optical interaction device forms a portion of said time integrating optical correlator and said space integrating optical correlator, said interaction device comprising:

a photoconductive layer in which the point by point multiplications between said optical and acoustic waves of said first spatial pattern are applied in optical form to said layer, said photoconductive layer having a conductance time constant adequate for executing a time integral of each point of said first spatial pattern to obtain at least one complex correlation function (or weight) $W_i(x)$, as a virtual second spatial pattern, and in which the auxiliary signals $a_i(t)$ are applied in surface wave acoustic form to said layer to obtain point by point conductances having a term equal to a multiplication between said optical quantities of said virtual second spatial pattern and said acoustic quantities to form said third spatial pattern, and means including a voltage source for producing a current through said photoconductor layer, said current having a component at the carrier frequency equal to the integral of the conductances of the points of said third spatial pattern for deriving the predicted interference signal $\hat{m}(t)$.

* * * * *